UNITED STATES PATENT OFFICE.

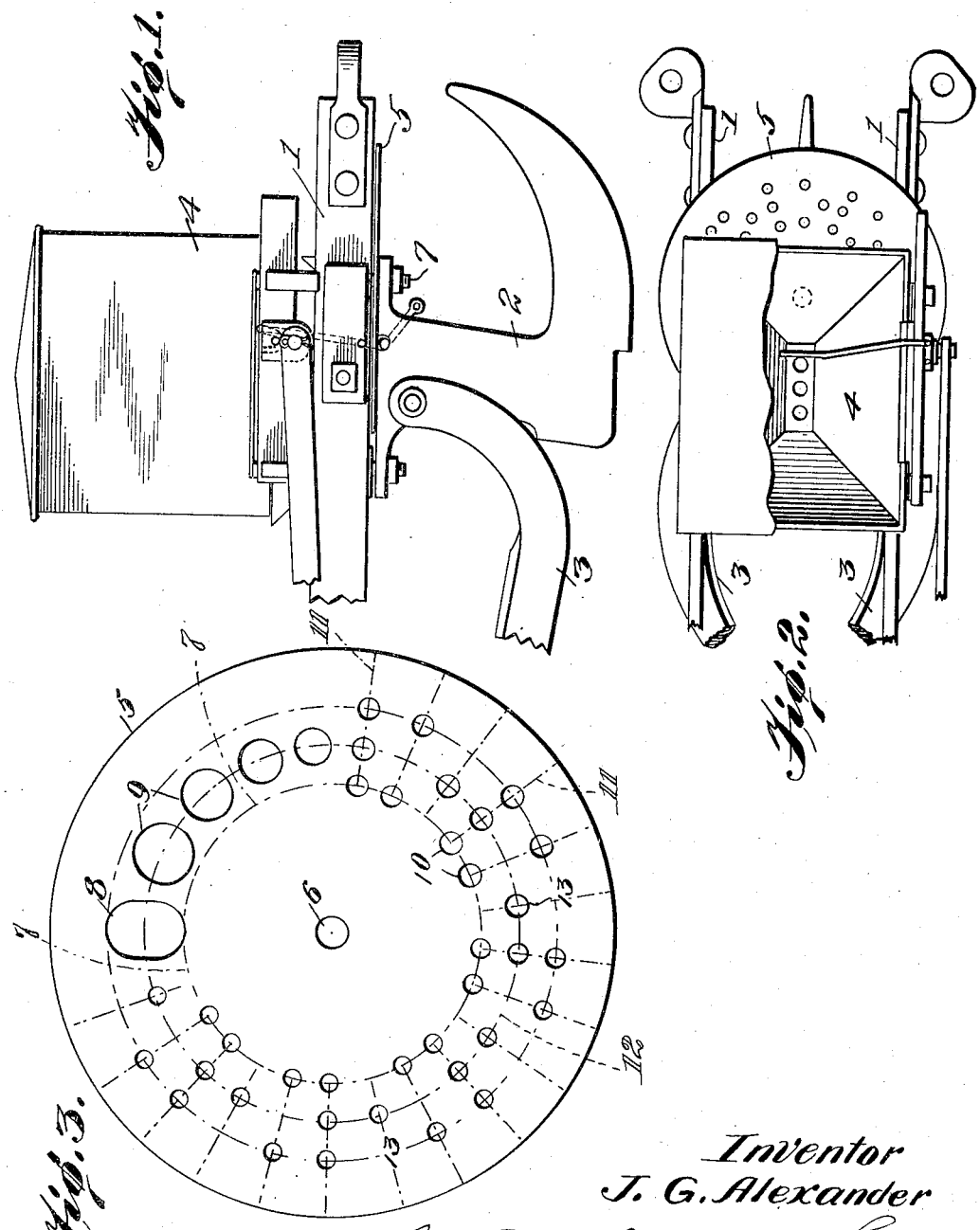

JAMES G. ALEXANDER, OF AMES, IOWA, ASSIGNOR TO ALEXANDER MFG. CO. INC., OF AMES, IOWA.

SEED-DISK FOR DRILLS.

1,330,365.　　　　　Specification of Letters Patent.　　Patented Feb. 10, 1920.

Application filed August 8, 1918. Serial No. 248,938.

*To all whom it may concern:*

Be it known that I, JAMES G. ALEXANDER, a citizen of the United States, residing at Ames, in the county of Story and State of Iowa, have invented certain new and useful Improvements in Seed-Disks for Drills, of which the following is a specification, reference being had therein to the accompanying drawings.

This invention relates to a garden seed drill, and more particularly to a seed disk for drills.

The object of the invention is the production of a simple and efficient disk whereby seeds of different sizes may be readily planted by a drill equipped with my disk, and which disk is provided with apertures arranged in a peculiar position so that the adjustment of the disk to accommodate the planting of different seeds can be readily accomplished.

With this and other objects in view my invention comprises certain combinations and arrangements of the seed passages or openings as will be more clearly pointed out in the following specification and illustrated in the accompanying drawings.

In the drawings,

Figure 1 is a fragmentary view in side elevation of a drill equipped with my improved disk; while Fig. 2 is a top, plan view of the same showing the cover of the hopper broken away.

Fig. 3 is a plan view of my improved disk.

Referring to the drawings by numerals, 1 represents the frame of the drill, to which are attached the drill shoe 2 and the seed covers 3. The hopper 4 is suitably supported upon the frame 1, and directly under the hopper 4, and between the drill shoe and frame 1, is positioned my improved circular disk 5, which is preferably formed of sheet metal.

The disk 5 is preferably circular in shape and is provided with a central pivotal opening 6, through which extends the bolt 7, whereby the disk 5 is rotatably secured to the frame 1 between the same and the drill shoe 2, as shown in Figs. 1 and 2.

Formed in the disk 5 is an inner, substantially circular row of seed-discharging openings or apertures, represented by the dotted line 7. This row of apertures 7, include holes or apertures of different sizes, such as aperture 8, through which lima beans or seed corn may pass, and apertures 9, through which nasturtium seeds, or any other round seed, may be discharged, and then smaller apertures 10, through which small seed, such as lettuce and radishes, may be discharged. When large seeds are being planted it is preferable only to use one large hole, but when a larger quantity of seeds are to be discharged, then a row of small apertures, such as is indicated by the dotted lines 11, may be placed directly under the discharge opening of the hopper 4, Fig. 2, and several seeds will be permitted to pass from the hopper into the drill. In the second row of apertures, represented by dotted line 12, there are single apertures, such as 13, for the planting of a single small seed, if desired. There is another outer row of apertures, arranged in a circular position, outside of the inner row 7, and the intermediate or central row 12.

It will be understood from the foregoing description that I regulate the flow of seed, first, by the size of the hole used, and, second, by the number of holes or apertures used. To plant accurately with a drill equipped with my disk, it is first necessary to select a hole or discharge aperture large enough to permit the largest of the seeds to be planted to pass through freely, but only one seed at a time, if so desired. Of course, if one hole does not plant enough seed, then two or more holes may be used. This arrangement prevents more than one seed from passing out at a time, through a single hole, and also overcomes the tendency to clog when two or more seeds cannot pass through the hole at the same time.

What I claim is:

As a new article of manufacture, a circular seed disk having an inner, an outer, and an intermediate row of seed-discharging apertures and a central pivotal opening, some of the apertures of said three rows being in transverse alinement and only the apertures of the intermediate row extending entirely around the disk, the transversely alined apertures of the three rows being of the same size, but the apertures of the intermediate row not in transverse alinement with the other apertures varying in size from that equal to the width of the three rows to the same size of all of the apertures in transverse alinement, and the apertures out of alinement gradually varying in size from the largest to the smallest, substantially as shown and described.

In testimony whereof I hereunto affix my signature.

JAMES G. ALEXANDER.